US006393979B1

(12) United States Patent
Tateishi

(10) Patent No.: US 6,393,979 B1
(45) Date of Patent: May 28, 2002

(54) THERMOSENSITIVE STENCIL, PRODUCTION METHOD THEREOF, THERMOSENSITIVE STENCIL PRINTING MASTER MAKING APPARATUS AND THERMOSENSITIVE STENCIL PRINTING APPARATUS

(75) Inventor: Hiroshi Tateishi, Shizuoka (JP)

(73) Assignees: Ricoh Company, Ltd., Tokyo; Tohoku Ricoh Co., Ltd., Miyagi-ken, both of (JP)

( * ) Notice: Subject to any disclaimer, the term of this patent is extended or adjusted under 35 U.S.C. 154(b) by 0 days.

(21) Appl. No.: 09/583,813

(22) Filed: May 30, 2000

(30) Foreign Application Priority Data

May 31, 1999 (JP) .......................................... 11-151274

(51) Int. Cl.[7] ............................ B41N 1/24; B41C 1/14; B32B 5/18

(52) U.S. Cl. ............................ 101/128.21; 101/128.4; 428/308.4; 427/336

(58) Field of Search ......................... 101/128.21, 128.4; 428/195, 308.4; 427/273, 335–337; 156/77

(56) References Cited

U.S. PATENT DOCUMENTS

| | | | | | |
|---|---|---|---|---|---|
| 5,843,560 | A | | 12/1998 | Ohta et al. | 428/137 |
| 5,875,711 | A | | 3/1999 | Tateishi et al. | 101/128.21 |
| 6,025,066 | A | * | 2/2000 | Terasawa et al. | 101/128.21 |
| 6,050,183 | A | * | 4/2000 | Tanaka et al. | 101/128.21 |
| 6,092,461 | A | * | 7/2000 | Tanaka et al. | 101/128.21 |

FOREIGN PATENT DOCUMENTS

| | | |
|---|---|---|
| EP | 747238 | * 12/1996 |
| GB | 2306689 | 5/1997 |
| GB | 2327129 | 1/1999 |
| GB | 2336916 | 11/1999 |
| JP | 54 33117 | 3/1979 |
| JP | 54033117 | 3/1979 |
| JP | 62198459 | 9/1987 |
| JP | 62-198459 | 9/1987 |
| JP | 3-193445 | 8/1991 |
| JP | 3193445 | 8/1991 |
| JP | 4 7198 | 1/1992 |
| JP | 4007198 | 1/1992 |
| JP | 8332785 | 12/1996 |

* cited by examiner

*Primary Examiner*—Stephen R. Funk
(74) *Attorney, Agent, or Firm*—Cooper & Dunham LLP

(57) ABSTRACT

A thermosensitive stencil has a thermoplastic resin film and a porous resin layer formed thereon, with the porous resin layer having a surface smoothness of 15 to 250 sec when measured by the method of Ohken-shiki prescribed in Japan Tappi No. 5. A method for producing the above-mentioned thermosensitive stencil, and an apparatus for making a printing master from the thermosensitive stencil and printing images are also provided.

8 Claims, No Drawings

THERMOSENSITIVE STENCIL, PRODUCTION METHOD THEREOF, THERMOSENSITIVE STENCIL PRINTING MASTER MAKING APPARATUS AND THERMOSENSITIVE STENCIL PRINTING APPARATUS

BACKGROUND OF THE INVENTION

1. Field of the Invention

The present invention relates to a thermosensitive stencil, production method thereof, a thermosensitive stencil printing master making apparatus and a thermosensitive stencil printing apparatus.

2. Discussion of Background

There is conventionally known a thermosensitive stencil which is prepared by attaching a thermoplastic resin film to a porous substrate, for example, a porous tissue paper, with an adhesive. Further, a sticking preventing layer is overlaid or. the thermoplastic resin film to prevent the thermoplastic resin film from sticking to a thermal head when perforations are made in the resin film by the application of heat thereto In practice, a porous tissue paper is made out of hemp fiber, synthetic fiber or wood fiber, which may be used in combination, and the thus prepared tissue paper and the thermoplastic resin film are laminated with an adhesive, and then a sticking preventing layer is provided on the surface of the resin film. Such a thermosensitive stencil is widely used in practice.

However, the above-mentioned conventional thermosensitive stencil has the following drawbacks:

(1) Since the fibers are partially superimposed in the tissue paper, the adhesive is unfavorably accumulated at the portion where the thermoplastic resin film is brought into contact with the superimposed fibers of the tissue paper. A perforation cannot be easily formed in such a port-on as mentioned above even by the application of thermal energy using the thermal head. Further, printing ink cannot smoothly permeate through the stencil at that portion. As a result, the images printed on an image-receiving medium using a printing master prepared from the above-mentioned thermosensitive stencil is lacking in evenness.

(2) The fibers themselves contained in the porous tissue paper hinder the printing ink from penetrating through the stencil, so that the printed images tend to become uneven.

(3) Because the fibers for use in the tissue paper are expensive, much spoilage is generated in the preparation of the stencil, for example, in a lamination step, and loss of tissue paper is unavoidable, the cost of the thermosensitive stencil is necessarily increased.

(4) The use of the fibers causes deforestation, and manufacture and disposal of the fibers adversely affect the environment.

To solve the above-mentioned problems, there are proposed improved thermosensitive stencils. For example, Japanese Laid-Open Patent Application No. Hei3-193445 discloses a thermosensitive stencil comprising a porous substrate comprising microfibers witha fineness of 1 denier or less. Although the above-mentioned problem (1) can be solved by this thermosensitive stencil, the problems (2) and (3) remain unsolved.

Japanese Laid-Open Patent Application No. Sho62-198459 discloses a method for producing a thermosensitive stencil by forming on a film a heat resistant resin pattern which is substantially continuous on the film by gravure printing, offset printing or flexography.

According to the above-mentioned printing technology, it is still difficult to print a pattern with a line width of 50 $\mu$m or less. Even though the formation of such a pattern can be achieved, the productivity is very poor and the cost is remarkably increased. In addition, when the line width is 30 $\mu$m or more, the heat resistant resin hinders the perforation from being clearly made, so that the printed image becomes uneven.

Furthermore, Japanese Laid-Open Patent Application No. Hei4-7198 discloses a thermosensitive stencil prepared by coating a mixture of a water-dispersed polymer and finely-divided particles of colloidal silica on the surface of a film and drying the above-mentioned mixture. Thus, a porous layer is provided on the film. From the thus prepared thermosensitive stencil, a printing master is produced, for example, using a commercially available printing master making apparatus "PRINT GOCCO" (Trademark), made by Riso Kagaku Corporation. Further, the above-mentioned application also discloses a method of printing images using such a printing master and a commercially available jet printing ink (Trademark "HG-4800 Ink", available from EPSON HANBAI Co., Ltd.).

However, the penetrability of the printing ink through the above-mentioned porous layer becomes poor. Therefore, when a thermosensitive stencil ink for general use is employed for producing a printed image, a sufficient image density cannot be obtained in practical use. In addition, the heat insulating properties of the porous layer are insufficient, resulting in impractical perforation. To solve such problems, the jet printing ink is used instead of the thermosensitive stencil ink. However, such a jet printing ink produces blurred images, and printed ink images are easily smeared because the jet printing ink tends to spread.

Japanese Laid-Open Patent Application No. Sho54-33117 discloses a thermosensitive stencil consisting of a thermoplastic resin film. By this application, the previously mentioned conventional problems (1) to (4) can be solved because a porous substrate such as a tissue paper is not employed.

However, there occurs another problem that the stiffness of the stencil becomes low when the thickness of the thermoplastic resin film is 10 $\mu$m or less. In such a case, the transportation of the stencil in apparatus such as a printing machine causes annoyance. To solve such a problem of troublesome transportation, Japanese Patent Publication 5-70595 proposes a printing method using a printing master prepared from the above-mentioned thermosensitive stencil. To be more specific, the printing operation is carried out in such a fashion that the printing master which is not cut into pieces, but used in a continuous length is wound round the periphery of a plate cylinder of the printing machine, and rotated along with the rotation of the plate cylinder during the printing operation.

According to this printing method, however, not only the printing master, but also the units for attaching the printing master to the plate cylinder and detaching the same therefrom are caused to rotate along with the rotation of the plate cylinder in the printing operation. Therefore, the turning moment of the plate cylinder is increased and the displacement from the rotating shaft is increased. In light of the above-mentioned factors, the printing machine is required to be heavy and large in this case.

On the other hand, when the thickness of the above-mentioned thermosensitive stencil consisting of the film is 5 $\mu$m or more, the thermal sensitivity becomes so poor and the heat insulating properties are so low that perforations cannot be easily formed in the film when thermal energy is applied to the stencil by use of a thermal head.

Furthermore, the thermosensitive stencil made of a film does not have so much heat insulating properties as those of the porous layer. Accordingly, thermal energy applied by a heating means is easily escaped from the film to a platen roller. Namely, satisfactory perforation cannot be achieved due to lack of thermal energy.

Japanese Laid-Open Patent Application No. Hei8-332785 discloses a thermosensitive stencil which comprises a thermoplas-tic film and a layer made of honeycomb cells formed on one side of the thermoplastic film. Further, another thermosensitive stencil is proposed in Japanese Laid-Open Patent Application No. Hei10-24667 that comprises a thermoplastic resin film and a porous resin layer formed on one side of the thermoplastic resin film, the pores with a diameter of 5 jam or more occupying an area of 4 to 80% of the entire surface area of the porous resin layer when the pore diameter is obtained by converting the form of a pore into a true round.

One of the features of the above-mentioned thermosensitive stencils is that a porous resin layer is coated on a remarkably thin substrate having a thickness of 0.5 to 10 $\mu$m. Such a thin substrate is desirable in terms of sensitivity in making of a printing master.

However, printability of the porous resin layer thus provided on the thin film cannot be easily determined. A factor to determine the printability is porosity of the porous resin layer. The porosity of the porous resin layer can be evaluated by measuring air permeability thereof. To measure the air permeability of the porous resin layer, the porous resin layer is conventionally peeled away from the substrate. The measurement of air permeability has been regarded as very complex and inconvenient. The porosity of the porous resin layer is also determined by making a perforation of an appropriate size corresponding to a solid area. In this case, however, the measurement significantly depends upon the rate of perforation.

It is proposed to evaluate the porosity using an Ohken-shiki smoothness tester prescribed in Japan Tappi No. 5. By use of this tester, the porosity can be conveniently measured.

Further, it is believed that the porosity of the porous resin layer has a relation to the properties of printed images.

Not only good porosity of the porous resin layer, but also good transportation of the stencil in the practical apparatus is required to obtain excellent properties of the printed images.

SUMMARY OF THE PRESENT INVENTION

A first object of the present invention is to provide a thermosensitive stencil with minimum variance of ink permeability, capable of producing excellent image quality.

A second object of the present invention is to provide a method of producing the thermosensitive stencil mentioned above.

A third object of the present invention is to provide a thermosensitive stencil printing master making apparatus.

A fourth object of the present invention is to provide a thermosensitive stencil printing apparatus.

The first object of present invention can be achieved by a thermosensitive stencil comprising a thermoplastic resin film and a porous resin layer formed thereon, the porous resin layer having a surface smoothness of 15 to 250 sec when measured by the method of Ohken-shiki prescribed in Japan Tappi No. 5.

The second object of the present invention can be achieved by a method for producing the above-mentioned thermosensitive stencil, comprising the steps of coating a mixture of a resin and a good solvent with respect to the resin on a thermoplastic resin film to prepare a coated layer, bringing a bad solvent with respect to the resin into contact with the coated layer before the good solvent is completely evaporated, and drying the coated layer to form a porous resin layer on the thermoplastic resin film.

The second object of the present invention can also be achieved by a method for producing the above-mentioned thermosensitive stencil, comprising the steps of coating a mixture of resin, and a good solvent and a bad solvent with respect to the resin on a thermoplastic resin film, and drying the mixture to form a porous resin layer on the thermoplastic resin film.

The third object of the present invention can be achieved by a thermosensitive stencil printing master making apparatus comprising means for holding the above-mentioned thermosensitive stencil in the form of a roll, and means for applying heat to the thermosensitive stencil to perforate therethrough.

The fourth object of the present invention can be achieved by a thermosensitive stencil printing apparatus comprising means for holding the above-mentioned thermosensitive stencil in the form of a roll, means for applying heat to the thermosensitive stencil to perforate therethrough, thereby making a thermosensitive stencil printing master, means for winding the thermosensitive stencil printing master around a plate cylinder, and means for printing using the thermosensitive stencil printing master.

DESCRIPTION OF THE PREFERRED EMBODIMENTS

Through the intense studies, the inventor of the present invention has found that a relation between the porosity in the thermosensitive stencil and the properties of the printed images can be analyzed conveniently and accurately by measuring the surface smoothness of the porous resin layer using an ohken-shiki smoothness tester. The present invention has been thus accomplished.

In the thermosensitive stencil of the present invention, a porous resin layer is provided on a thermoplastic resin film, and shows the surface smoothness of 15 to 250 sec when measured by the method of Ohken-sh4ki prescribed in Japan Tappi No. 5.

The surface smoothness of the porous resin layer is measured using the smoothness tester of Ohken-shiki prescribed in Japan Tappi No. 5. To Bernice specific, a ring having a highly smooth bottom surface is placed on a sample of a thermosensitive stencil with a load applied. A time (sec) required to pass a predetermined amount of air under a predetermined pressure from the inside of the ring to the outside thereof is measured to determine the surface smoothness of the sample.

The thermosensitive stencil of the present invention is made into a printing master, for example, by making perforations with a thermal head. The means for making perforations is not limited to the thermal head, but a printing master prepared from the thermosensitive stencil using a thermal head will be described below by way of example.

Quality of the printed images is affected by the surface smoothness of the thermosensitive stencil. This is because the ink permeability of the porous resin layer for use in the thermosensitive stencil is determined by porosity of the porous resin layer. The overall porous resin layer for use in the present invention has a continuous porous structure. Such a continuous porous structure car be observed on the surface of the porous resin layer. Accordingly, porosity of the porous resin layer corresponds to the surface smoothness thereof. The surface smoothness can be measured using the above described Ohken-shiki smoothness tester. By measuring the surface smoothness of the porous resin layer, the porosity of the porous resin layer can be determined. As described above, the porosity affects the ink permeability, which has an effect on the printing quality. In other words, the printing quality can be controlled by the porosity.

Also, the surface smoothness of the thermosensitive stencil is interrelated with the adhesion of the stencil with the thermal head, she adhesion of the stencil with the thermal head largely affects perforation quality, i.e., evenness, fidelity and reproducibility of the pores. The surface profile of the stencil is mainly determined by the surface roughness of he porous resin layer. The irregularity of the porous resin layer can be compensated to some extent by using a thermoplastic resin film and a sticking preventing layer provided when necessary. However, the thermoplastic resin film and the sticking preventing layer are comparatively thin, so that the irregularity due to the porous resin layer still remains on the outermost surface of the stencil.

The higher the surface smoothness of the porous resin layer, the better the adhesion with the thermal head, resulting in perforations with high fidelity. Namely, the adhesion of the printing master with the thermal head, which is determined by the surface smoothness of the porous resin layer, affects the fidelity of perforation, and consequently the printing quality of obtained images.

The transporting properties of the thermosensitive stencil are also important to determine the performance thereof. High stiffness is required to obtain excellent transportation properties of the stencil in the apparatus. Namely, the transportation properties depend on the stiffness of the thermosensitive stencil. The stiffness can be measured by a stiffness tester to be described later.

In the thermosensitive stencil comprising a thermoplastic resin film and a porous resin layer formed thereon according to the present invention, the porous resin layer has a surface smoothness of 15 to 250 sec, preferably 15 to 200 sec, when measured by the method of Ohken-shiki prescribed in Japan Tappi No. 5.

When the surface smoothness of the porous resin layer is less than 15 sec, the adhesion of the stencil with the thermal head is insufficient when a stencil printing master is prepared by making perforations using the thermal head, thereby decreasing perforation reliability. As a result, non-printed white spots will be produced in he printed images. In addition, when the surface smoothness is less than 15 sec, the porous resin layer cannot control the amount of a printing ink transferred, so that the printing ink between the plate cylinder and the printing master will excessively ooze in the course of printing. As a result, defects such as strike-through and smearing are easily caused.

On the other hand, when the surface smoothness exceeds 250 sec, the ink permeability becomes poor due to minute pores in the porous resin layer. There is a need to use a low-viscosity ink for making up for the poor ink permeability. Therefore, the printed ink images will be easily smeared, and the printing ink will ooze from the side of the plate cylinder and the edge portion of the printing master wound around the plate cylinder. In addition, when the surface smoothness is more than 250 sec, voltage in the porous resin layer is so low that the heat insulating effect of the porous resin layer is impaired. The result is that perforating operation with the thermal head is hindered.

As described above, to obtain excellent printed images, it is required co have a surface smoothness of the porous resin layer within the range of 15 to 250 sec.

In the present invention, one of the factors that largely affect the surface smoothness of the porous resin layer is number-average pore size in the porous resin layer. The number-average pore size in the porous resin layer is generally 10 to 50 μm, preferably 10 to 30 μm. When the number-average pore size is 10 μm or more, the ink well permeates. There is no need to use the above-mentioned low-viscosity ink. The drawbacks caused by the use of the low-viscosity ink can be eliminated. In addition, when the number-average pore size is 10 μm or more, the voltage of the porous resin layer is high enough to obtain sufficient heat insulating properties. The sufficient heat insulating properties can efficiently promote perforation with the thermal head.

On the other hand, when the number-average pore size is 50 μm or less, the porous resin layer can control the amount of a printing ink transferred so that the printing ink between the plate cylinder and the printing master will not excessively ooze when printing. As a result, defects such as strike-through and ink smearing can be minimized.

The porous resin layer for use in the present invention may have a number of pores, not only in an inner part, but also in a surface portion of the resin layer. it is desirable that the pores in the porous resin layer be continuous at least in the thickness direction thereof for good ink permeability.

Further, it is preferable that pores with a diameter of 5 μm or more occupy an area of 4 to 80%, preferably 10 to 60% of the entire surface area of the porous resin layer, provided that the pore diameter is obtained by converting the form of a pore into a true round. When such pores occupy an area of 4% or more of the entire surface area of the porous resin layer, the porous resin layer has good ink permeability and sufficient heat insulating properties. The sufficient heat insulating properties leads to excellent perforation with the thermal head.

The thickness of the porous resin layer varies depending on the type of resin used for the porous resin layer and the heat sensitivity of the thermoplastic resin film. It is preferable that the total thickness of the thermosensitive stencil comprising the porous resin layer and the thermoplastic resin film be 7 μm or less.

Preferably, the porous resin layer has a thickness of 5 to 100 μm, more preferably 6 to 50 μm. When the thickness of the porous resin layer is 5 μm or more, sufficient stiffness can be obtained, a portion of the porous resin layer connected to the perforated film port on will not be torn nor damaged thermally and mechanically. The amount of the ink transferred can be controlled so that the offset problem can be prepared. The amount of the ink transferred can be effectively controlled by properly thickening the porous resin layer. Uneven printing may be caused when the thickness of the porous resin layer is not uniform. It is desirable that the thickness of the porous resin layer be uniform. The thickness can be measured by a thickness gauge.

It is preferable that the deposition amount of the porous resin layer be in the range of 0.5 to 25 $g/m^2$, more preferably in the range of 2 to 15 $g/m^2$, and most preferably in the range of 4 to 12 $g/m^2$ on a dry basis. When the deposition amount of the porous resin layer is 0.5 $g/m^2$ or more on a dry basis, the stiffness is acceptable for practical use. On the other hand, when the deposition amount of the porous resin layer is 25 g/m$^2$ or less an a dry basis, the printing ink in a proper amount can penetrate through the porous resin layer, so that high image quality can be maintained.

It is preferable that the density of the porous resin layer be in the range of 0.01 to 1 g/cm$^3$, more preferably in the range of 0.1 to 0.6 g/cm$^3$. When the density of the porous resin layer is 0.01 g/cm$^3$ or more, the porous resin layer is provided with a sufficient strength and a desired stiffness, so that the porous resin layer itself does not become fragile. On the other hand, when the density of the porous resin layer is 1 g/cm$^3$ or less, the porosity of the porous resin layer is sufficient so that ink penetration is not hindered.

It is desirable that the porous resin layer comprise a material which is softened at a temperature of 100° C. or less for effectively making perforations with the thermal head.

Examples of the materials for use in the porous resin layer include vinyl resins such as poly(vinyl acetate), poly(vinyl butyral), a vinyl chloride—vinyl acetate copolymer, a vinyl chloride—vinylidene chloride copolymer, a vinyl chloride—acrylonitrile copolymer, and a styrene—acrylonitrile copolymer; polyethylene; polyamide such as nylon; polyethylene oxide; (meth)acrylate; polycarbonate; cellulose derivatives such as acetyl cellulose, acetylbutyl cellulose, and acetylpropyl cellulose.

Fine particles and fibrous substances may be added to the porous resin layer for controlling the configuration, strength, pore size, and stiffness of the porous resin layer, all of which are determined in a drying step. Examples of the fine particles include organic fine particles such as poly(vinyl acetate), poly(vinyl chloride), and poly(methyl acrylate); and inorganic fine particles and pigments such as zinc oxide, titanium dioxide, calcium carbonate, and silica. Examples of the fibrous substances include animal and vegetable natural fibers, mineral fibers, glass fibers, metal fibers, and silica fibers. The fine particles or the fibrous substances may be contained in the porous resin layer in an amount up to 200 wt. % of the total weight of the resin.

Also, a plasticizer may be added to the porous resin layer for providing the porous resin layer with flexibility. Examples of the plasticizers include tricresyl phosphate, dioctyl phosphate, and polyethylene glycol.

As the thermoplastic resin film for use in the thermosensitive stencil of the present invention, any thermoplastic films used in the conventional thermosensitive stencil can be used. Examples of the film include a vinyl chloride—vinylidene chloride copolymer film, a polypropylene film, and a polyester film. In particular, it is preferable to employ a polyester film in which perforations can be readily made with the application of a low energy thereto. For example, there can be employed a polyester film of which heat of fusion is 3 to 11 cal/g as disclosed in Japanese Laid-Open Patent Application No. Sho62-149496, a polyester film with a crystallinity index of 30% or less as disclosed in Japanese Laid-Open Patent Application No. Sho62-282983, and a polyester film Comprising a butylene terephthalate unit in an amount of 50 mol % or more as disclosed in Japanese Laid-Open Patent Application No. Hei2-158391, which are incorporated herein by reference.

It is preferable that the thickness of the thermoplastic resin film be in the range of 0.5 to 10 μm. When the thickness of the resin film is within the above-mentioned range, the porous resin layer formation coating liquid can be applied to the thermoplastic resin film with no difficulty, and at the same time, the perforations can be clearly made in the thermoplastic resin film by use of the thermal head.

Furthermore, in order to prevent the thermosensitive stencil from sticking to the thermal head in the course of making the perforations in the stencil, the thermosensitive stencil may further comprise a sticking preventing layer which is provided on the other side of the thermoplastic resin film, opposite to the porous resin layer with respect to the thermoplastic resin film.

The sticking preventing layer may comprise, for example, a silicone releasant, fluorine-containing releasant, or phosphate surfactant With respect to the stiffness of the thermosensitive stencil, it is preferable that the bending rigidity thereof be in the range of 5 to 50 mN measured by a Lorenzen & Wettre stiffness tester when the transportation properties of the thermosensitive stencil are taken into consideration. To be more specific, when the bending rigidity is 5 mN or more, there is no difficulty in the transportation of the thermosensitive stencil in the printing master making apparatus. On the other hand, when the bending rigidity is 50 mN or less, the obtained thermosensitive stencil can be flexibly curved along the roller in the printing master making apparatus, and heating elements of the thermal head can be brought into close contact with the thermoplastic resin film.

A method for producing the previously mentioned thermosensitive stencil of the present invention will be described below, but is not limited thereto.

The porous resin layer for use in the thermosensitive stencil is prepared by coating a mixture of a resin and a good solvent with respect to the resin on a thermoplastic resin film to prepare a coated layer, bringing a bad solvent with respect to the above-mentioned resin into contact with the coated layer before the good solvent is completely evaporated, and drying the coated layer.

To bring the aforementioned bad solvent into contact with the coated layer, the following methods are usable:

(1) Condensation of water (serving as the bad solvent) in air by decreasing the temperature of the coated surface in contact with a chilled roll, or by utilizing latent heat of vaporization of the good solvent, (2) Spraying the bad solvent onto the coated surface with a humidifier or an atomizer.

(3) Simultaneous implementation of the methods (1) and (2).

In any case, it is desirable that a bad solvent be brought into contact with the coated surface not immediately after the resin solution comprising a good solvent is coated, but after the coated surface of the above-mentioned resin solution is once cooled. A pore size of the porous resin layer tends to increase with decrease in temperature. Correspondingly, the amount of the bad solvent can be decreased.

Alternatively, the porous resin layer is prepared by coating a mixture of a resin, and a good solvent and a bad solvent with respect to the resin on a thermoplastic resin film, and drying the mixture.

Generally, the increase of the mixing ratio of the good solvent will result in a small pore size, while the increase of the mixing ratio of the bad solvent will result in a large pore size. A suitable mixing ratio by volume of the good solvent to the bad solvent is 4:1 for providing the number-average pore size of 10 to 50 μm.

In this case, when the temperature of the coating liquid is 10 to 20° C., the resin is precipitated in the coating liquid. The resin thus precipitated remains as an agglomerate in the porous resin layer after drying. Such an agglomerate unfavorably inhibits the ink penetration. To prevent the resin precipitation, it is preferable that the temperature of the coating liquid be higher. However, if the drying operation is started with the elevated temperature, the pores cannot be obtained or, if any, have small pore size. In view of this point, once the coating liquid is coated on the thermoplastic resin film, the temperature of the coated surface may be lowered before drying operation. It is preferable that the temperature be lowered by 2 to 30° C., more preferably 5 to 20° C. When the temperature of the coated surface is decreased by 2° C. or more, the pore size will advantageously grow. On the other hand, it is not difficult to decrease the temperature of the coated surface by 30° C. or less.

Upon coating of the coating liquid, the temperature of the coating liquid can be increased by increasing the liquid temperature in a tank that contains the coating liquid. Alternatively, it is preferable to employ a slit die with a temperature controlling means for coating. This is because substantially all the coating liquid extruded Prom the slit die can be deposited on the thermoplastic resin film and will not return to the tank. In this case, it is possible to minimize the change of the coating liquid in the tank because evaporation of the solvent as caused by increasing the liquid temperature in the tank can be prevented.

Other coating means such as a gravure roll and a wire bar are available. Using such coating means, it is preferable that the coating amount of the coating liquid be 30 to 1,000 times the predetermined thickness of the porous resin layer at the center thereof and be gradually decreased toward both edges of the film. When other coating means is adapted, the coating amount of the coating liquid may be scraped by a blade in the same way as mentioned above.

The structure of the porous resin layer thus produced by the above-mentioned methods is quite different from that in the conventional thermosensitive stencil. The porous resin layer for use in the present invention has such a structure that amorphous pores in the shape of a rod, sphere or branch are formed in combination. The porous structure is determined depending on the conditions for producing the porous resin layer, for example, types of resins, solid content in the resin coating liquid, temperature of the resin coating liquid, types of solvents, deposition amount of the resin coating liquid, drying temperature of the resin coating liquid, and ambient temperature and humidity upon coating. In particular, the temperature of the resin coating liquid, and the ambient temperature and humidity upon coating largely affect the porous structure. If the temperature of the resin coating liquid is 10° C. or less, the resin liquid is easily gelatinized so that it is hard to coat the resin coating liquid. It the temperature of the resin coatings liquid exceeds 30° C. upon coating on the film, it is difficult to form the porous resin layer on the thermoplastic resin film.

The present invention also provides a thermo-sensitive stencil printing master making apparatus comprising means for holding the above-mentioned thermo-sensitive stencil in the form of a roll, and means for applying heat to the thermosensitive stencil to perforate therethrough.

Furthermore, the present invention provides a thermosensitive stencil printing apparatus comprising means for holding the thermosensitive stencil in the Form of a roll, means for applying heat to the thermosensitive a stencil to perforate therethrough, thereby making a thermosensitive stencil printing master, means for winding the thermosensitive stencil printing master around a plate cylinder, and means for printing images using the thermosensitive stencil printing master.

The thermosensitive stencil printer according to the present invention will be schematically described by way of example. A printing master is prepared from the above-mentioned thermosensitive stencil by making perforations therein using the heating means. For example, there can be employed a thermal head having a plurality of heating elements disposed in a main scanning direction thereof. The thermosensitive stencil printing master thus prepared is then wound around a plate cylinder. The plate cylinder contains a printing ink therein. When the printing master overlaps with an image receiving medium, the ink is ejected from the inside of the plate cylinder, and ink images are printed on the image receiving medium through the printing master.

Other features of this invention will become apparent in the course of the following description of exemplary embodiments, which are given for illustration of the invention and are not intended to be limiting thereof.

EXAMPLE 1

[Formation of Thermosensitive Stencil]

4 parts by weight of a polyvinyl butyral resin "PVB3000-2" (Trademark) having a softening point of 87° C. manufactured by Denki Kagaku Kogyo Kabushiki Kaisha were added to a mixed solvent of 35.5 parts by weight of ethyl alcohol and 11.5 parts by weight of water. Then, 0.8 parts by weight of "AID PLUS SP" (Trademark) needle-like magnesium silicate manufactured by Mizusawa Kagaku were added thereto. The thus obtained mixture was thoroughly dispersed and mixed in a ball mill to form a coating liquid No. 1 for forming a porous resin layer.

The coating liquid No. 1 was uniformly coated on a 2.0-$\mu$m-thick biaxial oriented polyester film using a coater of which a head portion was maintained at 23° C. and 60% relative humidity (RH) so that the deposition amount of the coating liquid No. 1 was 5.0 g/cm$^2$ on a dry basis. The coated liquid was kept under the above-described ambient conditions for 20 seconds, and thereafter dried in a drying box at 50° C. for 2 minutes to form a porous resin layer on the polyester film.

Thus, a thermosensitive stencil No. 1 according to the present invention was produced.

The following properties of the thermosensitive stencil No. 1 were measured:

(1) Surface smoothness of the porous resin layer: measured by Ohken-shiki smoothness tester.

(2) Stiffness of stencil: measured by a Lorenzen & Wettre stiffness tester at a distance of cantilever of 1 mm and at a bending angle of 30°.

(3) Thickness of film: measured by a JIS type thickness gauge "MEI-10" (Trademark) manufactured by CITIZEN Corporation.

By setting the thermosensitive stencil No. 1 in a commercially available stencil printing machine "PRIPORT VT-3950" (Trademark), made by Ricoh Company, Ltd., equipped with a thermal head, the transporting properties of the stencil were evaluated on the following scale:

○: Well transported from a printing master making unit to a printing master discharging unit automatically.

X: Not automatically transported from a printing master making unit to a printing master discharging unit because of wrinkling and bending of the stencil.

Further, using the above-described "PRIPORT VT-3950" with the thermosensitive stencil No. 1, stencil printing was carried out. She image quality of the obtained images was evaluated on the following scale:

◎: Excellent in image density, uniform in a solid portion, and noiseless in a half tone image portion.

○: Good in image density and uniform in a solid portion.

X: Insufficient image density.

XX: Poor dot reproducibility, and non-printed spots in a solid portion.

TABLE 1 shows the evaluation results of the thermosensitive stencil No. 1 obtained in Example 1.

EXAMPLE 2

A mixture of 3 parts by weight of cellulose acetate butyrate having a softening point of 152° C., 20 parts by weight of acetone having a boiling point of 56.1° C., 5 parts by weight of water having a boiling point of 100.0° C., and 0.3 parts by weight of silica powder was dispersed and mixed in a ball mill to prepare a coating liquid No. 2 for forming a porous resin layer.

The coating liquid No. 2 was uniformly coated on one surface of a 1.5-μm-thick biaxial oriented polyester film using a wire bar so that the deposition amount of the coating liquid No. 2 was 10.4 g/cm$^2$ on a dry basis. Immediately after coating, the coated liquid was dried with hot air at 50° C. for 3 minutes to form a porous resin layer on the polyester film.

A mixture of a silicone resin and a catatonic anti static agent was coated on the other surface of the biaxial oriented polyester film so that the deposition amount of the mixture was 0.05 g/m$^2$ on a dry basis, whereby a sticking preventing layer was provided to prevent the fused polyester film from sticking to a thermal head, and impart the anti static properties.

Thus, a thermosensitive stencil No. 2 according to the present invention was produced.

TABLE 1 shows the evaluation results of the thermosensitive stencil No. 2 obtained in Example 2.

EXAMPLE 3

The procedure for preparation of the thermosensitive stencil No. 1 in Example 1 was repeated except that the deposition amount of the coating liquid No. 1 was changed to 10.0 g/cm$^2$ on a dry basis using a wire bar.

Thus, a thermosensitive stencil No. 3 according to the present invention was prepared.

TABLE 1 shows the evaluation results of the thermosensitive stencil No. 3 obtained in Example 3.

EXAMPLE 4

The procedure for preparation of the thermosensitive stencil No. 2 in Example 2 was repeated except that the deposition amount of the coating liquid No. 2 was changed to 2.5 g/cm$^2$ on a dry basis using a wire bar.

Thus, a thermosensitive stencil No. 4 according to the present invention was prepared.

TABLE 1 shows the evaluation results of the thermosensitive stencil No. 4 obtained in Example 4.

EXAMPLE 5

4 parts by weight of a polyvinyl butyral resin "PVB3000-2" (Trademark) having a softening point of 87° C. manufactured by Denki Kagaku Kogyo Kabushiki Kaisha were added to a mixed solvent of 42 parts by weight of ethyl alcohol and 5 parts by weight of water. Then, 0.8 parts by weight of "AID PLUS SP" (Trademark) needle-like magnesium silicate manufactured by Mizusawa Kagaku were added thereto. The thus obtained mixture was thoroughly dispersed and mixed in a ball mill to form a coating liquid No. 4 for forming a porous resin layer.

The coating liquid No. 4 was uniformly coated on a 2.0-μm-thick biaxial oriented polyester film using a coater of which a head portion was maintained at 40° C. and 95 to 99% relative humidity (RH) so that the deposition amount of the coating liquid No. 4 was 5.0 g/cm$^2$ on a dry basis. The coated liquid was kept under the above-described ambient conditions for 20 seconds, and thereafter dried in a drying box at 50° C. for 2 minutes to form a porous resin layer on the polyester film.

Thus, a thermosensitive stencil No. 5 according to the present invention was produced.

TABLE 1 shows the evaluation results of the thermosensitive stencil No. 5 obtained in Example 5.

COMPARATIVE EXAMPLE 1

A mixture of 4 parts by weight of polyvinyl acetal, 36 parts by weight of ethyl alcohol, 26 parts by weight of water, and 8 parts by weight of plate-shaped magnesium silicate (talc) "MICROACE P4" (Trademark) manufactured by Nippon Talc Co., Ltd. was dispersed and mixed in a ball mill to prepare a coating liquid No. 3 for forming a porous resin layer.

The procedure for preparation of the thermosensitive stencil No. 2 in Example 2 was repeated except that the coating liquid No. 3 was coated on the polyester film in a deposition amount of 2.0 g/cm$^2$ on a dry basis.

Thus, a comparative thermosensitive stencil No. 1 was prepared.

TABLE 1 shows the evaluating results of the comparative thermosensitive stencil No. 1 obtained in comparative Example 1.

COMPARATIVE EXAMPLE 2

The procedure for preparation of the thermosensitive stencil No. 1 in Example was repeated except that the deposition amount of the coating liquid No. 1 was changed to 15.2 g/cm$^2$ on a dry basis using a wire bar.

Thus, a comparative thermosensitive stencil No. 2 was prepared.

TABLE 1 shows the evaluation results of the thermosensitive stencil No. 2 obtained in Comparative Example 2.

The transporting properties of this stencil were poor, so that the stencil was manually transported in the apparatus.

TABLE 1

| | Surface Smoothness (sec) | Stiffness (mN) | Thickness of Film ($\mu$m) | Deposition Amount of Porous Resin Layer ($g/m^3$) | Printed Image Quality | Adhesion with Thermal Head | Transporting Properties |
|---|---|---|---|---|---|---|---|
| Example 1 | 21 | 21 | 2.0 | 5.0 | ○ | ○ | ○ |
| Example 2 | 180 | 30 | 1.5 | 10.4 | ◎ | ○ | ○ |
| Example 3 | 15 | 50 | 2.0 | 10.0 | ○ | ○ | ○ |
| Example 4 | 250 | 5 | 1.5 | 2.5 | ◎ | ○ | ○ |
| Example 5 | 22 | 21 | 2.0 | 5.0 | ○ | ○ | ○ |
| Comparative Example 1 | 280 | 2 | 1.5 | 1.0 | x | ○ | x |
| Comparative Example 2 | 8 | 80 | 2.0 | 15.2 | xx | x | ○ |

As is apparent from the results shown in TABLE 1, the thermosensitive stencil having a surface smoothness of 15 to 250 sec according to the present invention produced excellent printed quality, and transporting properties.

The term "surface smoothness" as used in the claims means surface smoothness when measured by the method of Ohken-shiki prescribed in Japan Tappi No. 5, Section B. Japan Tappi No. 5, Section B is incorporated herein by this reference. Japanese Patent Application No. 11-151274 filed May 31, 1999 is hereby incorporated by reference.

What is claimed is:

1. A thermosensitive stencil comprising a thermoplastic resin film and a porous resin layer formed thereon, said porous resin layer having a surface smoothness of 15 to 250 sec.

2. The thermosensitive stencil as claimed in claim 1, having a stiffness of 5 to 50 mN.

3. The thermosensitive stencil as claimed in claim 1, wherein said thermoplastic resin film has a thickness of 0.5 to 10 $\mu$m.

4. The thermosensitive stencil as claimed in claim 1, wherein said porous resin layer is formed in a deposition amount of 0.5 to 25 $g/m^2$ on a dry basis.

5. A method for producing a thermosensitive stencil, comprising the steps of:

coating a mixture of a resin and a good solvent with respect to said resin on a thermoplastic resin film to prepare a coated layer, bringing a bad solvent with respect to said resin into contact with said coated layer before said good solvent is completely evaporated, and drying said coated layer to form a porous resin layer on said thermoplastic resin film, wherein said porous resin layer has a surface smoothness of 15 to 250 sec.

6. A method for producing a thermosensitive stencil, comprising the steps of:

coating a mixture of resin, and a good solvent and a bad solvent with respect to said resin on a thermoplastic resin film, and drying said mixture to form a porous resin layer on said thermoplastic resin film, wherein said porous resin layer has a surface smoothness of 15 to 250 sec.

7. A thermosensitive stencil printing master making apparatus comprising:

means for holding a thermosensitive stencil in the form of a roll, and means for applying heat to said thermosensitive stencil to perforate therethrough, wherein said thermosensitive stencil comprises a thermoplastic resin film and a porous resin layer formed thereon, said porous resin layer having a surface smoothness of 15 to 250 sec.

8. A thermosensitive stencil printing apparatus comprising:

means for holding a thermosensitive stencil in the form of a roll, means for applying heat to said thermosensitive stencil to perforate therethrough, thereby making a thermosensitive stencil printing master, means for winding said thermosensitive stencil printing master around a plate cylinder, and means for printing using said thermosensitive stencil printing master, wherein said thermosensitive stencil comprises a thermoplastic resin film and a porous resin layer formed thereon, said porous resin layer having a surface smoothness of 15 to 250 sec.

* * * * *